(12) United States Patent  (10) Patent No.: US 8,760,494 B1
Twede  (45) Date of Patent: Jun. 24, 2014

(54) UV DETECTION OF OBJECTS HIDDEN IN FOLIAGE

(75) Inventor: David Twede, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 92 days.

(21) Appl. No.: 13/100,772

(22) Filed: May 4, 2011

Related U.S. Application Data

(60) Provisional application No. 61/331,223, filed on May 4, 2010.

(51) Int. Cl.
*H04N 9/64* (2006.01)
*G01T 1/20* (2006.01)
*H04N 9/43* (2006.01)

(52) U.S. Cl.
CPC ... *H04N 9/43* (2013.01); *H04N 9/64* (2013.01)
USPC ........................................ 348/33; 250/370.11

(58) Field of Classification Search
CPC ........... H04N 9/43; H04N 9/76; H04N 5/332; H04N 5/33; H04N 7/18; H04N 7/181; G06T 11/001; G09B 9/063; B82Y 15/00; G01J 3/06; G01J 3/14; G01B 11/022; G01B 11/024; G01C 15/00; A61N 5/067
USPC ............. 348/135, 33, 34, 37, 38; 250/370.11; 257/20
See application file for complete search history.

(56) References Cited

U.S. PATENT DOCUMENTS

| 4,790,654 | A |   | 12/1988 | Clarke |
| 5,575,438 | A | * | 11/1996 | McGonigle et al. ............ 244/13 |
| 6,009,340 | A |   | 12/1999 | Hsia |
| 6,765,617 | B1 |  | 7/2004 | Tangen et al. |
| 7,447,335 | B1 |  | 11/2008 | Quintana et al. |
| 2002/0017612 | A1 | * | 2/2002 | Yu et al. .................... 250/370.11 |
| 2004/0135881 | A1 | * | 7/2004 | Jones et al. ...................... 348/33 |
| 2005/0262995 | A1 |  | 12/2005 | Kilkis |
| 2006/0066738 | A1 |  | 3/2006 | Hershey et al. |
| 2009/0201487 | A1 |  | 8/2009 | Paluszek et al. |
| 2010/0145416 | A1 | * | 6/2010 | Kang et al. ...................... 607/89 |
| 2011/0089323 | A1 |  | 4/2011 | Treado et al. |

OTHER PUBLICATIONS

Evan Preston, et al., "Development of a Field-Portable Multispectral Imaging and Classification System", Battelle, Columbus, OH, ASPRS/ACSM 1994.

(Continued)

*Primary Examiner* — Dave Czekaj
*Assistant Examiner* — Dramos I Kalapodas
(74) *Attorney, Agent, or Firm* — Withrow & Terranova, PLLC

(57) ABSTRACT

An imaging system for identifying camouflaged or concealed objects includes an image sensor for receiving at least a portion of reflected light from an interrogation region having foliage including at least an ultraviolet (UV) including band. The image sensor includes a 2-D photodetector array that has a plurality of photodetector pixels that provides sensitivity to the UV band. The 2-D photodetector array generates at least a first detection signal from at least the UV band. A green light filter can be added to exclude green light in the background from being detected. A processor for data processing is coupled to an output of the photodetector array that forms processed image data from at least the first detection signal. The processed image data can be used to generate a visual image that reveals camouflaged or concealed objects, or be used for automatic detection of camouflaged or concealed objects.

19 Claims, 10 Drawing Sheets

(56) References Cited

OTHER PUBLICATIONS

R. Stolper, et al., The Design and Evaluation of a Multi-Spectral Imaging Camera for the Inspection of Transmission Lines and Substation Equipment, Eksom, South Africa.

Non-final Office Action for U.S. Appl. No. 13/080,419 mailed May 3, 2013, 9 pages.
Final Office Action and Applicant-Initiated Interview Summary for U.S. Appl. No. 13/080,419 mailed Aug. 12, 2013, 13 pages.
Advisory Action for U.S. Appl. No. 13/080,419 mailed Dec. 4, 2013, 3 pages.

* cited by examiner

UV DETECTION OF OBJECTS HIDDEN IN FOLIAGE

CROSS REFERENCE TO RELATED APPLICATIONS

This application claims the benefit of Provisional Application Ser. No. 61/331,223 entitled "UV DETECTION OF OBJECTS HIDDEN IN FOLIAGE", filed May 4, 2010, which is herein incorporated by reference in its entirety.

FIELD

Disclosed embodiments relate to imaging for detection of camouflaged or concealed objects (CC&D).

BACKGROUND

Although hyperspectral imaging can image a continuous band generally extending from the ultraviolet (UV) to the infrared (IR), and has promise to detect CC&D, hyperspectral imaging involves a large data collection and is thus computationally intensive, involves expensive/complex sensor configurations, and imposes high training/instructional demands on analysts. As compared to hyperspectral imaging, multispectral imaging over a plurality of discontinuous bands can provide less expensive, easier to use imagery. However, known multispectral imaging systems are poor at detecting modern CC&D (i.e., have low performance), such as military green/IR painted objects in a scene including natural greenery such as trees, shrubs and grass.

SUMMARY

Disclosed embodiments include imaging methods and imaging systems for detecting camouflaged or concealed objects (CC&D) in interrogation regions having trees, bushes and plants (collectively referred to herein as foliage). Such embodiments are based on the Inventor's discovery that real foliage absorbs significantly more ultraviolet (UV) light as compared to military painted objects and non-painted man-made objects such as tires, treated wood and some plastics. Disclosed embodiments can include narrowband imaging, such as by including a narrowband UV laser source, or multispectral imaging (either active or passive) by detecting a UV comprising band and at least one reference band that excludes the UV. The UV comprising band generally includes at least a portion of the near UV range (NUV) from 300 nm to 400 nm of which UVA from 315 nm to 400 nm is a part, and can also include at least a portion of the middle UV (MUV) range of 200 nm to 300 nm.

The Inventor has also recognized that foliage reflects in a portion of the near infrared (NIR) in the wavelength range from 760 nm to about 1,500 nm about four times more than green light, such as compared to military paint covered objects hidden in green foliage that are designed to be highly reflective to green light. Disclosed multispectral embodiments can be implemented with an inexpensive commercially available color camera modified to remove its hot minor to allow detection into the NUV (as well as into the NIR) together with an optional filtering arrangement that blocks green light as described below.

In one embodiment a narrowband UV source, such as a UV laser, is used as a light source. This embodiment is generally limited to short range (e.g. a few kilometers) imaging due to atmospheric UV attenuation, and due to limited laser power, is generally mainly useful for night time imaging. For night time imaging, the 2-D photodetector array can comprise an electron multiplied charge-coupled device (CCD).

Multispectral embodiments all generally include passive NUV detection while optionally blocking green light, which in one embodiment is implemented with a green stop filter, and in other embodiments by using a bandpass filter that passes a UV comprising band and excludes other bands including green light.

In a first disclosed embodiment, a method of detecting camouflaged or concealed objects in an interrogation region having foliage comprises receiving at least a portion of reflected light from an interrogation region including at least one UV comprising band at a 2-D photodetector array that comprises a plurality of photodetector pixels that provides sensitivity to the UV comprising band. At least a first detection signal is generated that includes a contribution from the UV comprising band. Processed image data is formed from at least the first detection signal, and camouflaged or concealed objects within the interrogation region are identified from the processed image data.

The method can further comprise blocking green light so that the portion of reflected light received at the 2-D photodetector array excludes green light, where green light is defined herein as being in a wavelength range of 530 nm±25 nm. The method can further comprise filtering so that the portion of reflected light received by the 2-D photodetector array further includes another separately detected portion from a first reference band that is exclusive of the UV comprising band to generate at least a first reference signal, such as a reference band that comprises a NIR comprising band. In this embodiment, the method can further comprise decorrelating data from the first detection and data from the first reference signals to form a decorrelated detection signal, wherein an image is formed from the decorrelated detection signal.

In one arrangement, a green stop filter is disposed on top of a 2-D photodetector array that provides full spectrum imaging. Band-stop filters, also known as band-rejection filters, are filters that pass most wavelengths of light unaltered, but attenuate in a specific wavelength range to very low levels. Alternatively, a rocker or spinning filter wheel can be used for the filtering to generate a plurality of separately detected different detection and reference, including a UV comprising band detection signal and one or more non-UV comprising reference band signals. For example, a rocker can alternate filtering between two or more filters, one passing a UV comprising band and one or more filters passing a non-UV comprising band (e.g., a NIR comprising band).

An image can be formed from the processed image data, and camouflaged or concealed objects within the interrogation region can be identified from the image, such as by generation of a visible image on a suitable display device that allows identification by the naked eye (e.g. by a soldier). Any color can generally be assigned in the processing to the UV comprising band data (and optional NIR band data) to highlight the presence of camouflaged or concealed objects in the image. In another embodiment the identification can comprise automatic identification by a processor so that there is no need for generation of a visible image.

Automatic identification systems include an image sensor and processor having associated memory that utilizes the UV comprising band data and optional reference band data together with reference measures stored in the memory to automatically determine whether the processed image data includes camouflaged or concealed objects within the inter-

DETAILED DESCRIPTION

Figure 1:
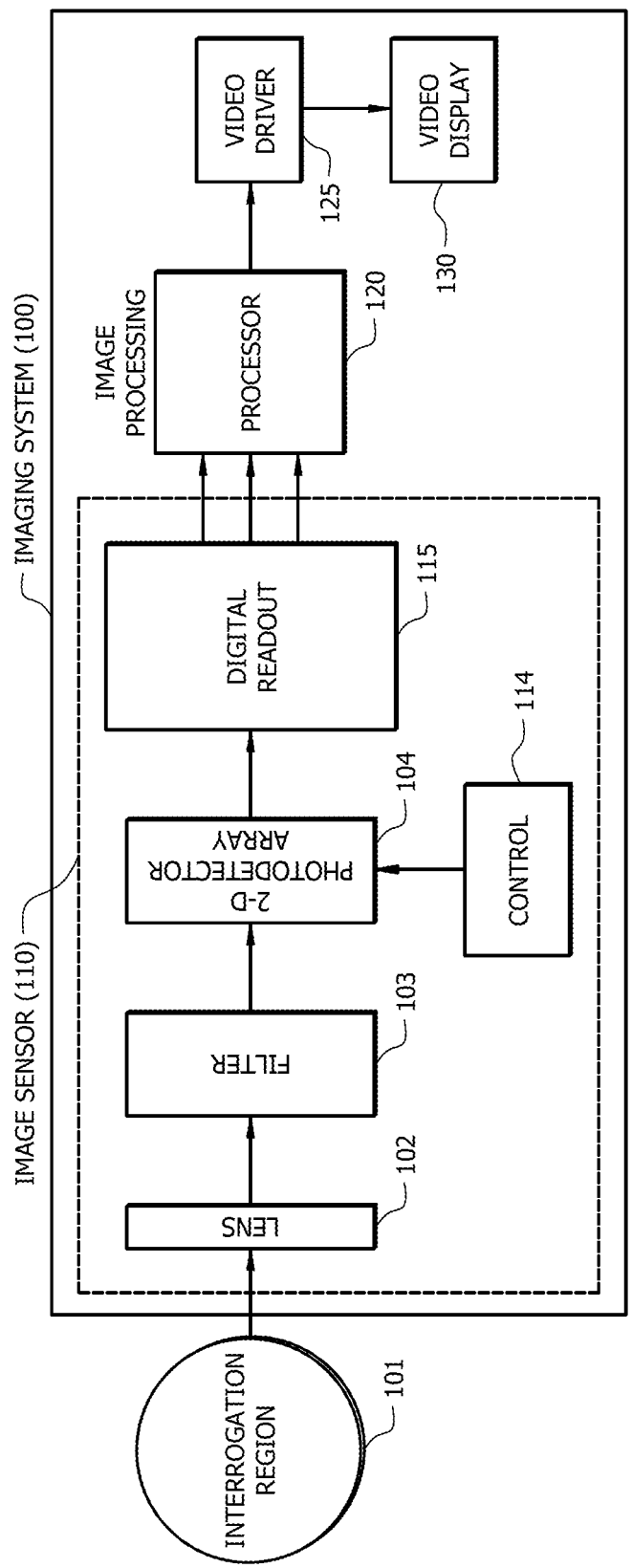
FIG. 1 is block diagram depiction of an example UV-based manual multispectral imaging system that renders a displayed image for the user to determine the presence of man-made objects in a background including foliage in an interrogation region, according to a disclosed embodiment.

Disclosed embodiments are described with reference to the attached figures, wherein like reference numerals, are used throughout the figures to designate similar or equivalent elements. The figures are not drawn to scale and they are provided merely to illustrate aspects disclosed herein. Several disclosed aspects are described below with reference to example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. Disclosed embodiments are not limited by the illustrated ordering of acts or events, as some acts may occur in different orders and/or concurrently with other acts or events. Furthermore, not all illustrated acts or events are required to implement a methodology in accordance with this Disclosure.

Disclosed embodiments detect man-made objects hidden in foliage by generating at least a first detection signal from an interrogation region that includes a UV comprising band, where the first detection signal optionally excludes green light. A processor generates processed image data from the detection signal(s). An image can be formed from the processed image data, and in one embodiment camouflaged or concealed man-made objects within the interrogation region can be identified by users from the image generated enabled by the Inventor's discovery that foliage absorbs significantly more UV as compared to military painted and certain other man-made objects, so that hidden objects appear to be significantly "brighter" in the UV revealed scene including natural foliage. In the case of military painted objects, such objects can be painted with green, brown or yellow camouflage paints. As a result, for visual imaging embodiments, the particular color (arbitrarily) assigned to the UV peak or band (e.g., blue) reveals the hidden objects from the green foliage background in the image. In another embodiment the identification can comprise automatic identification by a processor so that there is no need for generation of a visible image (see FIG. 2 described below).

FIG. 1 is block diagram depiction of an example manual UV-based multispectral imaging system 100 that renders a displayed image for the user to determine the presence of hidden objects in a background including in an interrogation region 101, according to a disclosed embodiment. System 100 comprises an image sensor 110 that comprises a lens 102 that provides an aperture for system 100 and focuses incoming light, so that system 100 operates on reflected light emanating from interrogation region 101 collected by lens 102 and shown sensed by a single common 2-D photodetector array that comprises a plurality of pixels. System 100 is generally a passive imaging system as it does not require a separate light source, such as a light source that provides UV light.

A filter 103 is shown that is optically aligned and matched (i.e. has about the same size) with respective ones of the plurality of photodetector pixels in 2-D photodetector array 104. The filter 103 can be a band reject, band pass, low pass, or long pass, and can be embodied as a polarizing filter. Although shown as an internal filter, filter 103 can be an external filter (i.e., positioned in front of lens 102).

2-D photodetector array 104 transduces light from the UV comprising band, and generally also the visible (color) band, and optionally the NIR band, into electrical signals. The 2-D photodetector array 104 can comprise, for example, a plurality of CCD elements, or a plurality of CMOS sensing elements such as photodiodes, phototransistors, or avalanche diodes. Night (or low light) operation can be provided by a 2-D photodetector array comprising electron multiplied CCD, or a camera light source that provides UV comprising light (not shown).

The filter array 103 shown can comprise a plurality of filter elements, including an UV comprising band pass and at least one other reference bandpass that excludes UV. As described above, respective ones of the filter elements of filter 103 are optically aligned and substantially matched (i.e. have about the same size) with respective ones of the pixels in 2-D photodetector array 104.

In one particular embodiment, a filtering arrangement implementing a UV comprising band for the detection signal and a two-color/NIR band combination for first and second reference signals are used to maximize color differences between military type paints, healthy foliage and dry/decaying foliage. By using an image sensor having a filtering arrangement to detect a three band combination comprising a UV comprising band and two NIR (two color red/IR) bands, hidden objects including military painted objects have been found to be easily highlighted when hidden in foliage.

In one embodiment, the passband is UV comprising, and green, red and NIR (700 to ≥770 nm, such as 700 nm to 1,000 nm) are blocked. In another embodiment, the passbands are UV and red, and green and NIR bands are blocked. In yet another embodiment, the passbands are UV, red and NIR, and the green band is blocked. Other band selection embodiments are disclosed in the Examples described below.

Associated with 2-D photodetector array 104 is a control block 114 that comprises control electronics. As known in the art, the control block 114 generates the control signals (e.g., control voltages) to control the operation of the 2-D photodetector array 104. When the 2-D photodetector array 104 comprises CMOS elements, control block 114 can generally be formed on the same substrate having a semiconductor surface (i.e. a silicon chip) that generates the on-chip control signals (e.g., voltage pulses) used to control the operation of the 2-D photodetector array 104.

The voltage outputs provided by 2-D photodetector array 104 are read out by the digital read out 115 shown in FIG. 1 that generally comprises an analog to digital (A/D) converter. 2-D photodetector array 104 provides a plurality of outputs.

Processor 120, such as a digital signal processor or microcomputer, is coupled to receive and process the plurality of electrical signals provided by digital read out 115. The processor 120 provides data processing (i.e., image processing) as described herein. An output of processor 120 is coupled to a video driver 125 which is coupled to a video display 130, such as a video screen (e.g., color monitor), that provides a viewable color image.

Multispectral imaging system 100 can be integrated with glasses or goggles, such as a head mounted display (HMD). In one embodiment an augmented reality HMD uses image data from processor 120 to form computer generated image (CGI) data which is registered and combined with a real world view for the user. In this embodiment, images from the CGI data displayed on the display screen in the field of view of a soldier can alert the soldier to hidden man-made objects such as military painted objects hidden in foliage, which can allow soldiers to avoid the hidden objects, and also alert others to initiate clearing the hidden objects.

As recognized by the Inventor, convention digital color cameras can be slightly modified to provide disclosed image sensors. The 2-D photodetector arrays in conventional digital color cameras (typically CCDs) can also sense NIR light (700 to 1,000 nm) and UV light (300 or 350 nm to 400 nm) that can be seen in images obtained because all light detected by a conventional digital color camera goes to one of its three color sensing pixel types (RGB). However, the hot mirror present in conventional digital color cameras blocks the NIR and some UV from reaching the photodetector pixels. In this embodiment, the slight modification comprises removing the hot minor from a conventional digital color camera. As a result of this modification, the camera records very different colors/images. The UV and NIR light that goes to each of these RGB photosensor pixels gets translated electronically to a red or green or blue value depending on the particular sensor element receiving the UV or NIR light. Alternatively, a custom camera can be used for the image sensor not having a hot mirror in the first place.

Figure 2:
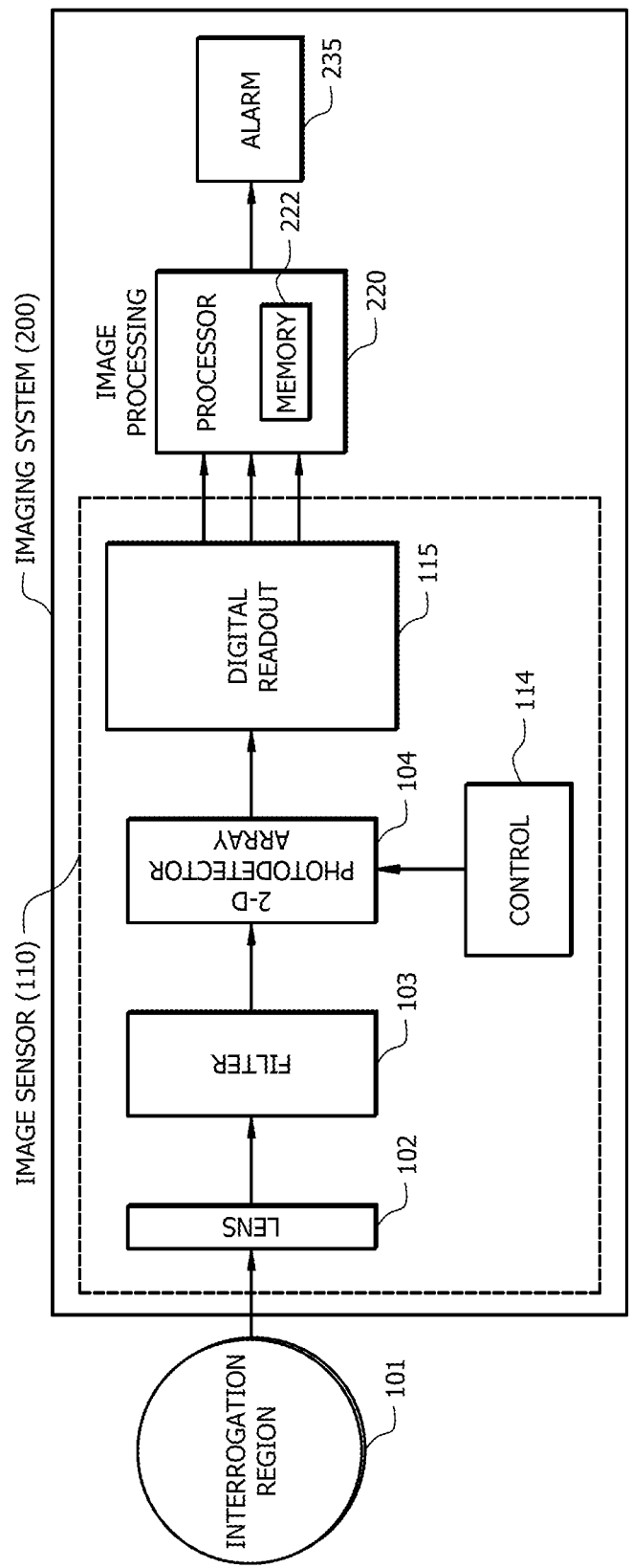
FIG. 2 is block diagram depiction of an example UV-based automatic multispectral imaging system that includes a processor including associated memory that automatically determines the presence of hidden objects in a background including foliage in an interrogation region, according to a disclosed embodiment.

FIG. 2 is block diagram depiction of an example UV-based automatic multispectral imaging system 200 that includes a processor 220 including associated memory 222 that automatically determines the presence of hidden man-made (e.g., military painted objects) in a background including foliage in an interrogation region 101, according to a disclosed embodiment. Processor 220 identifies hidden man-made objects in the interrogation region 101 using one or more of the following stored reference measures: UV signal level thresholds from the first detection signal (e.g., relative to reflected UV levels from real foliage), statistical measures (e.g., covariance, classification) on counts from the 2-D photodetector array, and shapes of detected patterns (e.g., facet shapes of vehicle sides, top, turrets, wheels, tracks and other surfaces).

The processor 220 includes data processing software for utilizing (e.g, comparing, such as ratioing and/or scaling) both UV comprising data from first detection signal and non-UV band data from the reference signal to generate processed image data, and uses the reference measure(s) to automatically identify the presence of hidden man-made objects such as military painted objects within the interrogation region based on the processed image data. The automatic disturbed ground detection system 200 is shown including an alarm 235 (e.g., audible or blinking light) that can be activated if processor 220 detects presence of hidden man-made objects in the interrogation region 101.

Figure 3:
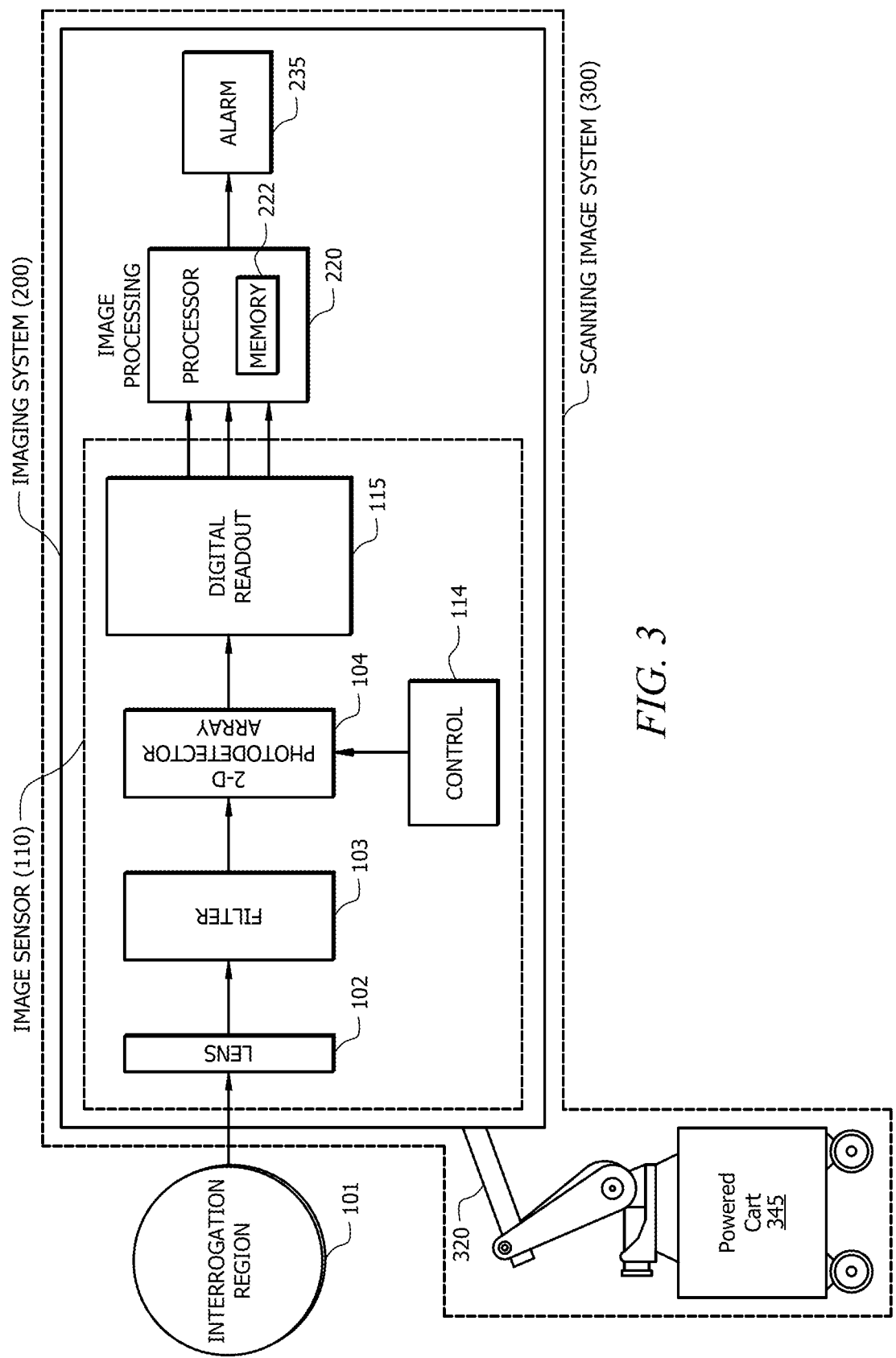
FIG. 3 is a depiction of an example automatic scanning multispectral imaging system that comprises the automatic multispectral imaging system shown in FIG. 2 together with at least one mechanical scanner shown as a robotic arm mechanically coupled to the imaging system for scanning the imaging system across a plurality of different surface portions within the interrogation region, according to a disclosed embodiment.

FIG. 3 is a depiction of an example automatic scanning multispectral imaging system 300 that comprises the automatic multispectral imaging system 200 shown in FIG. 2 together with at least one mechanical scanner 320 shown as a robotic arm 320 mechanically coupled to the imaging system 200 for scanning the imaging system 200 across a plurality of different surface portions within the interrogation region 101, according to a disclosed embodiment. Automatic scanning multispectral imaging system 300 is shown including a powered cart 345, such as a battery powered cart, where the robotic arm 320 is affixed to the powered cart 345. The automatic scanning multispectral imaging system 300 can be affixed, for example, to a vehicle, such as a tank or jeep, unmanned aerial or unmanned ground vehicle (i.e., a drone). As described above, the image sensor 110 for systems 100 and 200 can comprise a full spectrum digital video camera having at least one filter thereon. However, as disclosed above, in other embodiments, the image sensor can be provided by a custom Bayer element having two (2) or more different filters, or comprise separate elements (i.e. split sensor designs, such as using a spinning filter wheel).

Figure 4A:
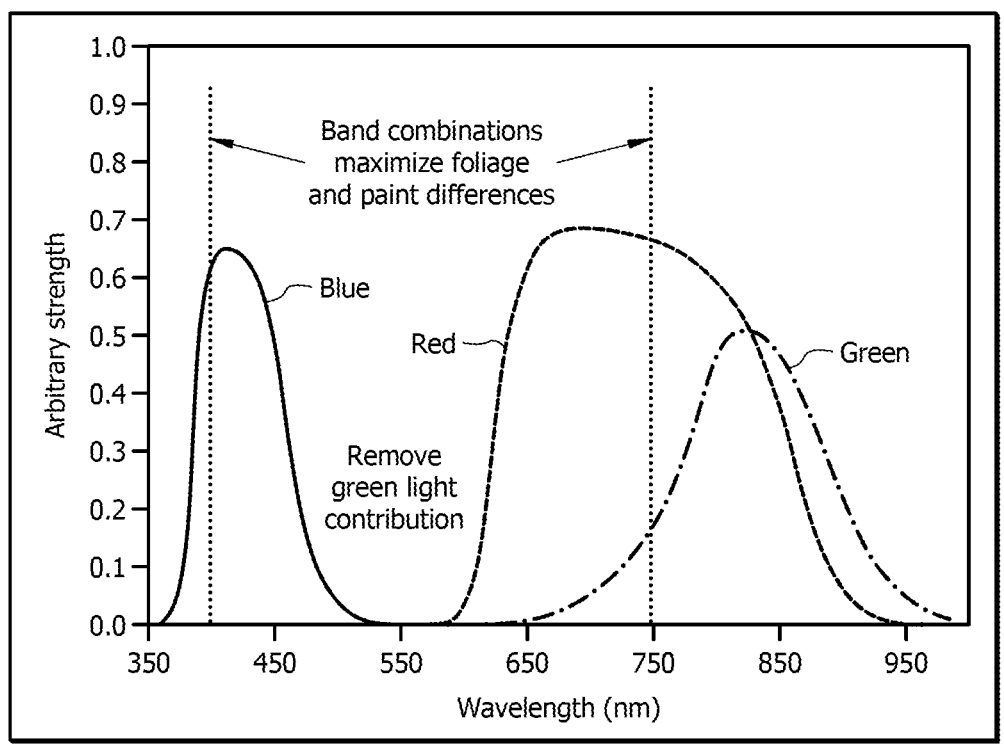
FIG. 4A is a plot of example band combinations for identifying hidden objects in a background including foliage, including a UV/blue band, a red/first NIR band, and a second NIR band, along with example band assignments for color images, according to a disclosed embodiment.

FIG. 4A is a plot of example band combinations for identifying hidden man-made objects in a background including foliage, including a UV/blue band for the detection signal, and a red/first NIR band, and a second NIR band for first and second reference band signals, along with example band assignments (to blue, red and green), according to a disclosed embodiment. As can be seen, green light is blocked. As disclosed above, a color camera comprising a conventional digital color camera can be modified to remove its hot mirror and add a green stop filter in front to allow the photodetector array to detect the UV comprising band but not green light. Moreover, as described above, the separate detection of the respective bands (in this example the UV comprising detection signal and first and second non-UV reference signals) can be implemented by using a rocker or filter wheel that would alternate between different bandpass filters.

The band assignments were not changed so that blue pixels (having blue bandpasses) can be seen to record UV/blue light, red pixels (having red bandpasses) to record red light and IR light and green pixels (having green passes) to record NIR light since green light is blocked by the green stop filter. However, band assignments are arbitrary that are generally based on image presentation preferences.

The embodiment shown in FIG. 4A takes advantage of the UV and two NIR bands that are split right around the leading NIR reflectance band of foliage. By not collecting green light, and by decorrelating data from the UV/NIR channels, significant image separations of hidden man-made objects such as military painted objects within foliage is accomplished. As disclosed above, such imaging can be achieved with inexpensive, very mature technology (conventional digital color cameras) together with a slight modification to remove the hot minor with additional optical filtration and specific data processing as described below.

EXAMPLES

Disclosed embodiments are further illustrated by the following specific Examples, which should not be construed as limiting the scope or content of this Disclosure in any way. For example, although all Examples below relate to manual multispectral imaging system embodiments that render displayed images for the user to determine the presence of camouflaged or concealed hidden objects in an interrogation region, as disclosed above, disclosed embodiments include automatic multispectral imaging systems that include a processor including associated memory that automatically determines the presence of camouflaged or concealed hidden objects in an interrogation region without the need for a rendered image.

Figure 4B:
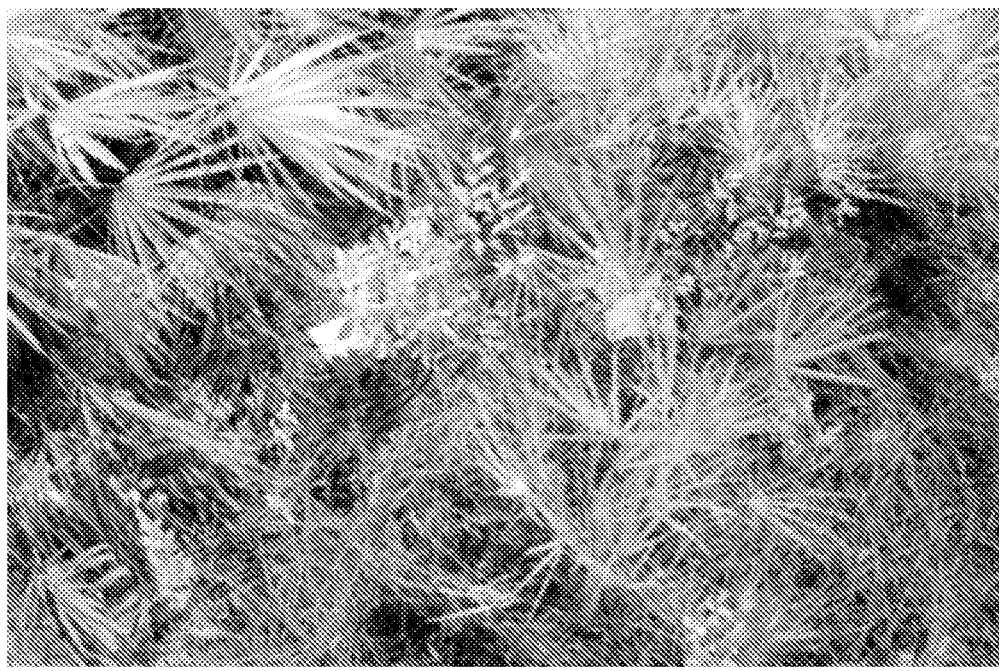
FIGS. 4B and 4C are scanned images showing two military painted panels in them, according to a disclosed embodiment. These images were each transformed into black and white (B&W) using the color channel that represented the brightest return from the painted panels.
Figure 4C:

Example color images were obtained using a modified color camera with a magenta (green stop) filter positioned over the photodetector array from reflected light received from an interrogation region having foliage and two (2) camouflaged or concealed objects in the interrogation region following specific decorrelation of color channels derived from the modified digital color camera described relative to FIG. 4A. FIGS. 4B and 4C are scanned images showing two military painted panels in them. These images were each transformed into black and white (B&W) using the color channel that represented the brightest return from the painted panels. Specifically, FIG. 4B is a scanned NIR image processed to B&W from the red channel data (the color image was captured as would a false-color IR industry standard, with the highest paint reflection being in the NIR), while FIG. 4C is a scanned UV comprising image processed to B&W from the blue channel data (the color image captured with a full spectrum camera and green stop filter). The image in FIG. 4C can be seen to clearly reveal the two hidden military painted panels.

As noted above, the detection signal can be obtained from light in at least one reference band that excludes the UV. In this embodiment, the method can further comprise decorrelating data from the detection signal and the reference signal to form a decorrelated detection signal, wherein the image is formed from the decorrelated detection signal. Image decorrelation is useful when band overlaps exist. For example, image channel decorrelation stretch (ICDS) is a technique to enhance the color separation in images with high inter-channel correlation. ICDS is a mathematical procedure that transforms a number of possibly correlated spectral or polar metric data channels into a smaller number of uncorrelated variables that are inherently as close to orthogonal as possible in variance space.

ICDS is mathematically defined as an orthogonal linear transformation that transforms the data to a new coordinate system such that the channels are rotated to become as orthogonal as possible with respect to all other channels. ICDS is theoretically the optimum transform for given data in least square terms. It is achieved by computing the covariance within and between channels, and then computing from the covariance the eigenvectors and eigenvalues of the set of channel data. Next, the matrix of eigenvectors (referred to as the rotation matrix, called R) is used to linearly rotate the original channel data to the optimally orthogonal set.

The orthogonal channel data is then contrast stretched using a "stretching vector" (or Normalization vector), called s, which is formed by taking the reciprocal of the square root of each element in the eigenvalue vector, and multiplying it by the desired standard deviation for the output image channels. The final transformation matrix, called T, is composed from the rotation matrix and the stretching vector. This is done by the following matrix multiplication:

$$T = R^T s R$$

Where $R^T$ is the transpose of the rotation matrix, s is the normalization vector (reciprocal of root of eigenvalues of R).

FIGS. 5A-I show example bandpass range(s) the can be used to detect camouflaged or concealed objects hidden in foliage using a modified conventional CCD-based digital color camera, modified to be a full spectrum camera by removing its hit mirror cameras as described above, with the respective FIGS. showing results obtained from different filtering combinations comprising one or more external filters, according to various disclosed embodiments. In all embodiments described, a UV comprising band is passed by the filtering arrangement and green light is blocked to remove the spectral region that would otherwise become a confusing background.

Figure 5A:
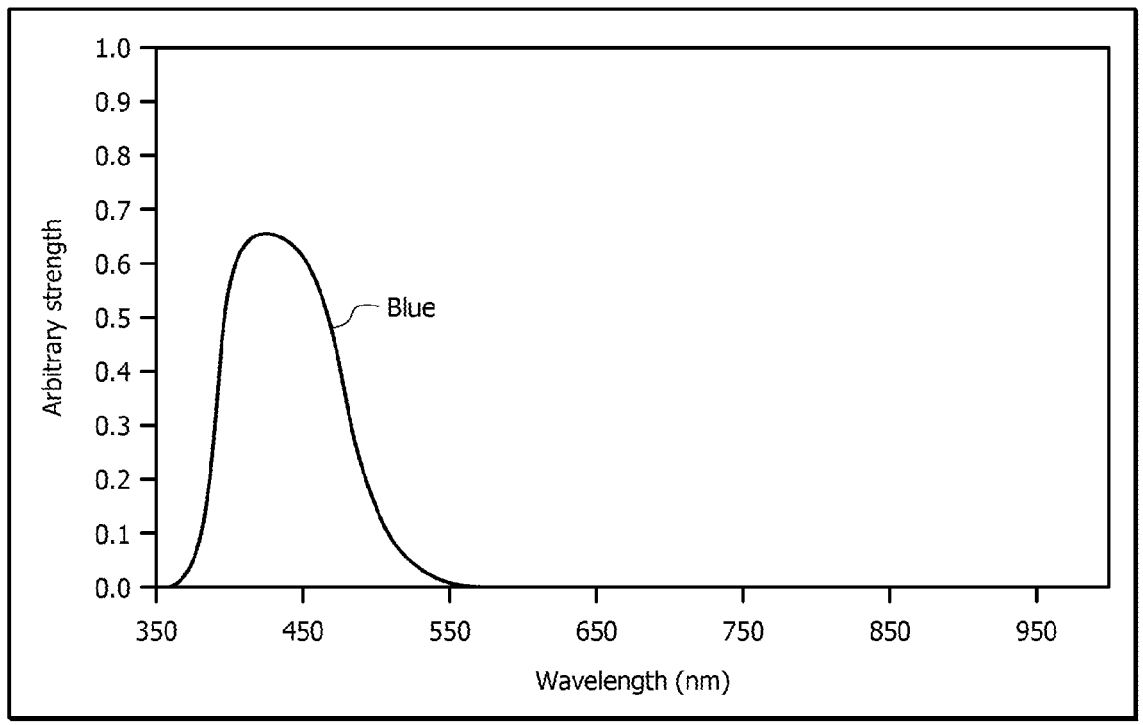
FIGS. 5A-I show example bandpass filter range(s) for various color camera arrangements having one or more external filters, according to various disclosed embodiments.
Figure 5B:
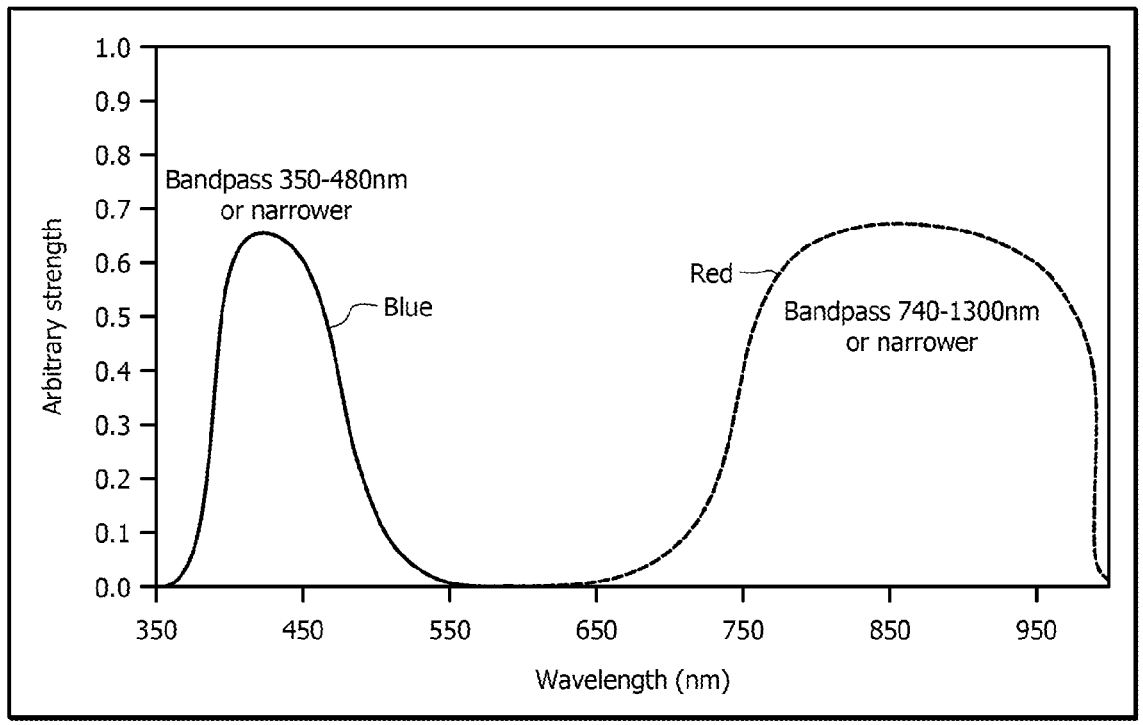

FIG. 5A shows a single UV comprising bandpass embodiment that can be implemented using a spinning wheel or fixed bandpass filter over a Bayer detector array. The bandpass can pass a UV comprising band from about 350 nm to 480 nm, or pass a narrower band. FIG. 5B shows a UV comprising bandpass and a reference band that excludes the UV comprising band provided by a NIR comprising bandpass embodiment that can be implemented using a spinning wheel or fixed filter over a Bayer array. The UV comprising bandpass can pass a UV comprising band from 350 nm to 480 nm, or pass a narrower band, while the NIR comprising bandpass can pass a NIR comprising band from 740 nm to 1,300 nm, or narrower.

Figure 5C:
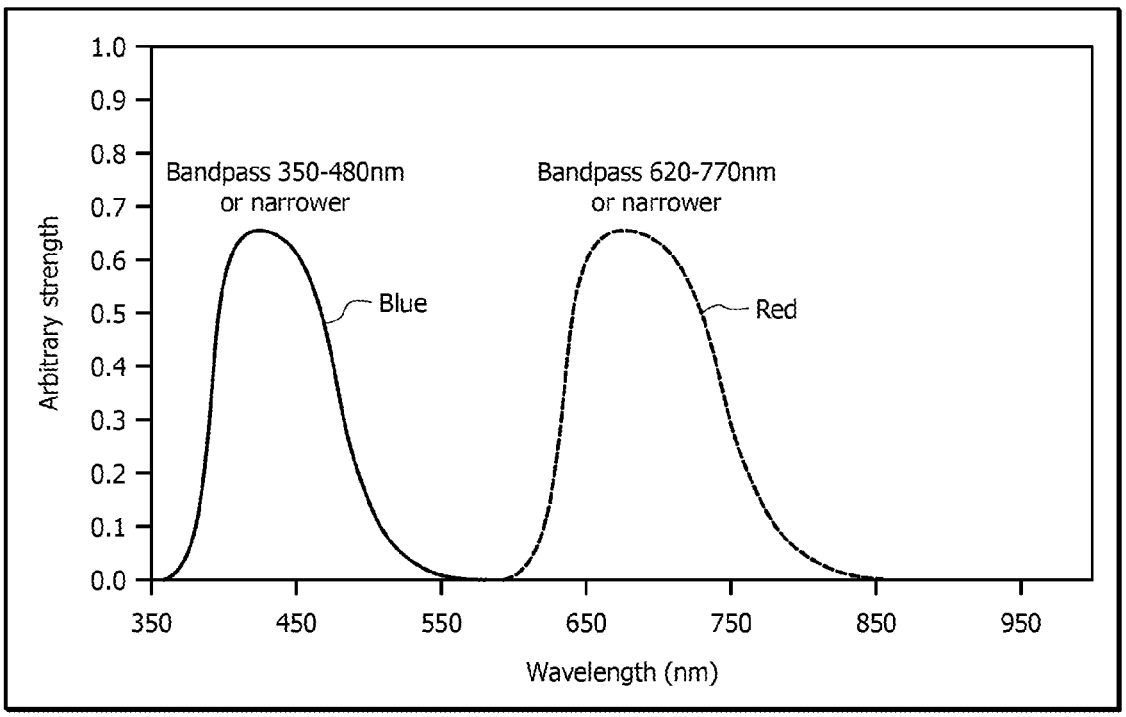
Figure 5D:
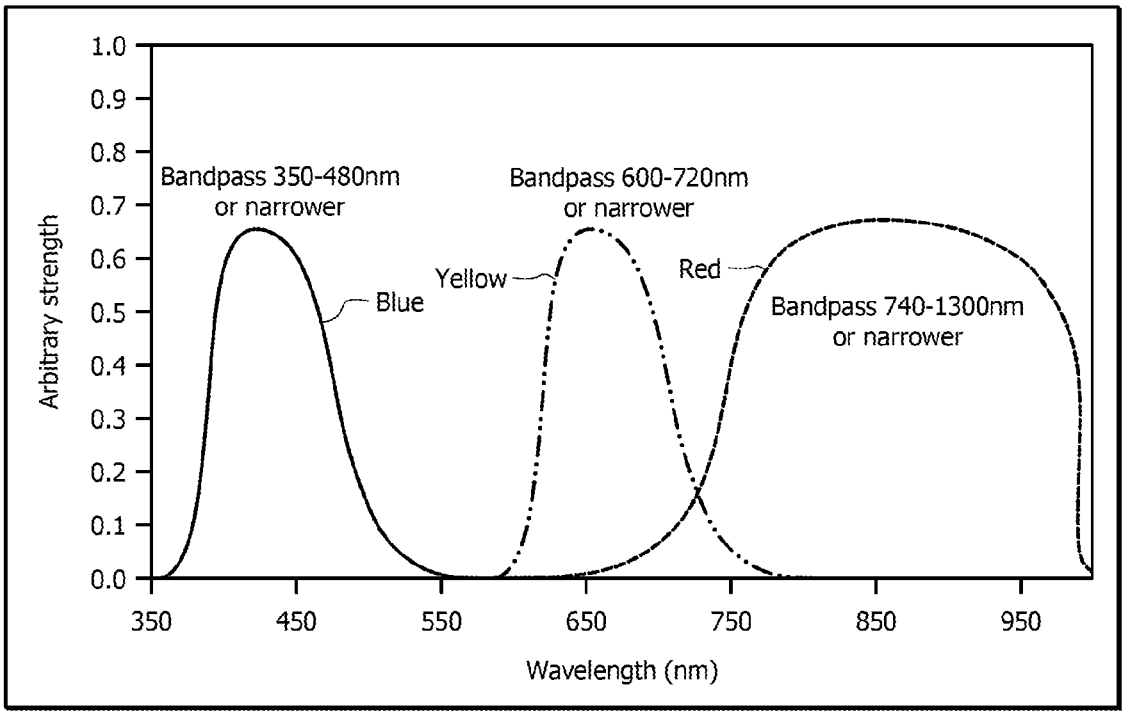
Figure 5E:
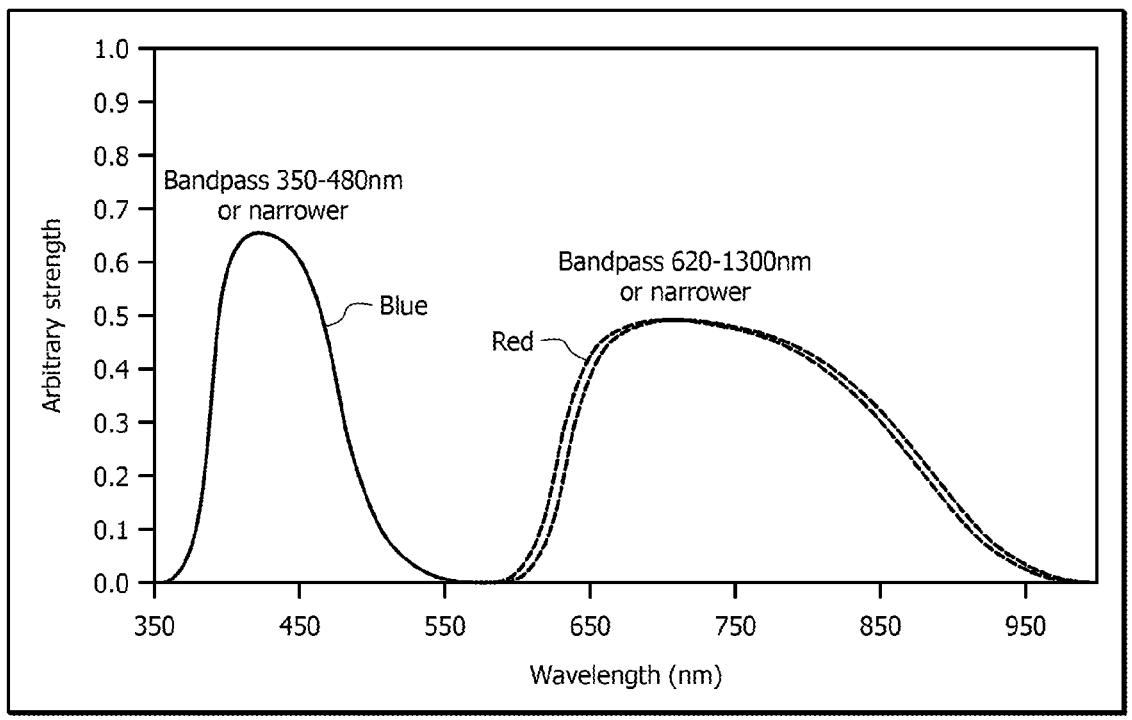

FIG. 5C shows a UV comprising bandpass and a NIR comprising bandpass embodiment that can be implemented using a spinning wheel or fixed filter over a Bayer array. The UV comprising bandpass can pass a UV comprising band from about 350 nm to 480 nm, or pass a narrower band, while the NIR comprising bandpass that provides the reference band can pass 620 to 770 nm, or a narrower band. FIG. 5D shows a UV comprising bandpass, and two reference bandpasses comprising a yellow/orange red bandpass and a NIR comprising bandpass embodiment that can be implemented using a spinning wheel or fixed filter over a Bayer array. The UV comprising bandpass can pass a UV comprising band from about 350 nm to 480 nm, or pass a narrower band, the yellow/orange red bandpass can pass 600 nm to 720 nm or narrower, while the NIR comprising bandpass can pass 740 to 1,300 nm, or narrower. FIG. 5E shows a UV comprising bandpass and a polarized NIR comprising bandpass embodiment that can be implemented using a spinning wheel or fixed filter over a Bayer array. The UV comprising bandpass can pass a UV comprising band from about 350 nm to 480 nm, or pass a narrower band, while the NIR comprising bandpass that provides a reference band can pass 620 nm to 1,300 nm, or narrower.

Figure 5F:
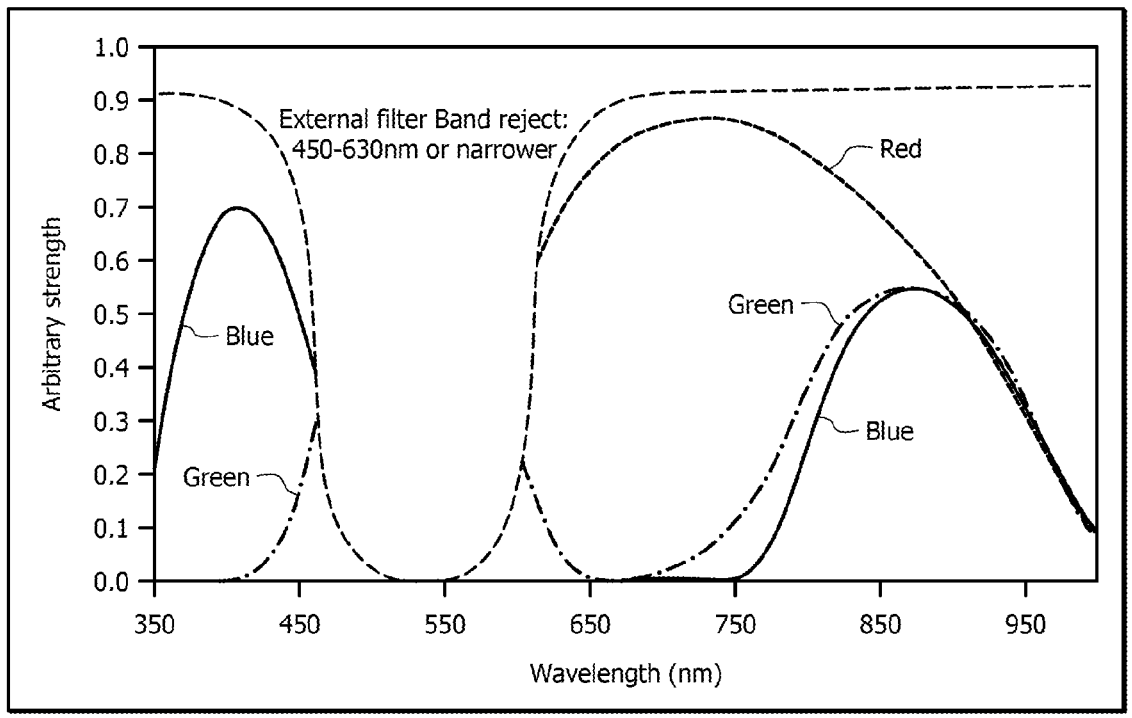
Figure 5G:
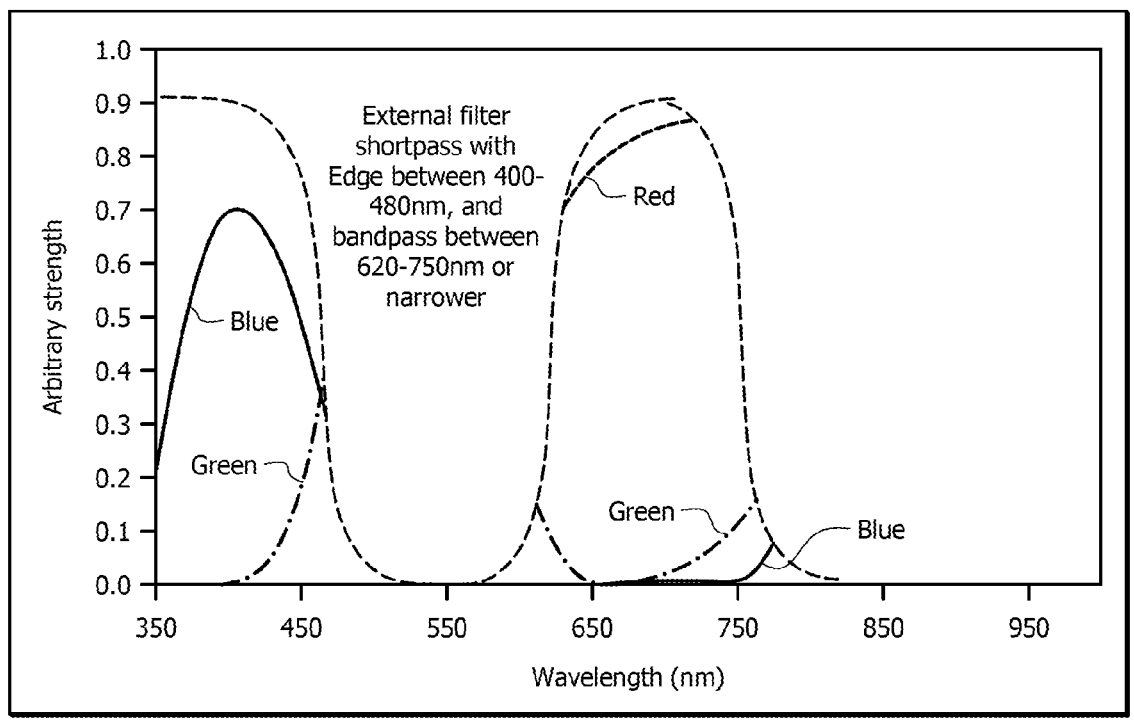
Figure 5H:
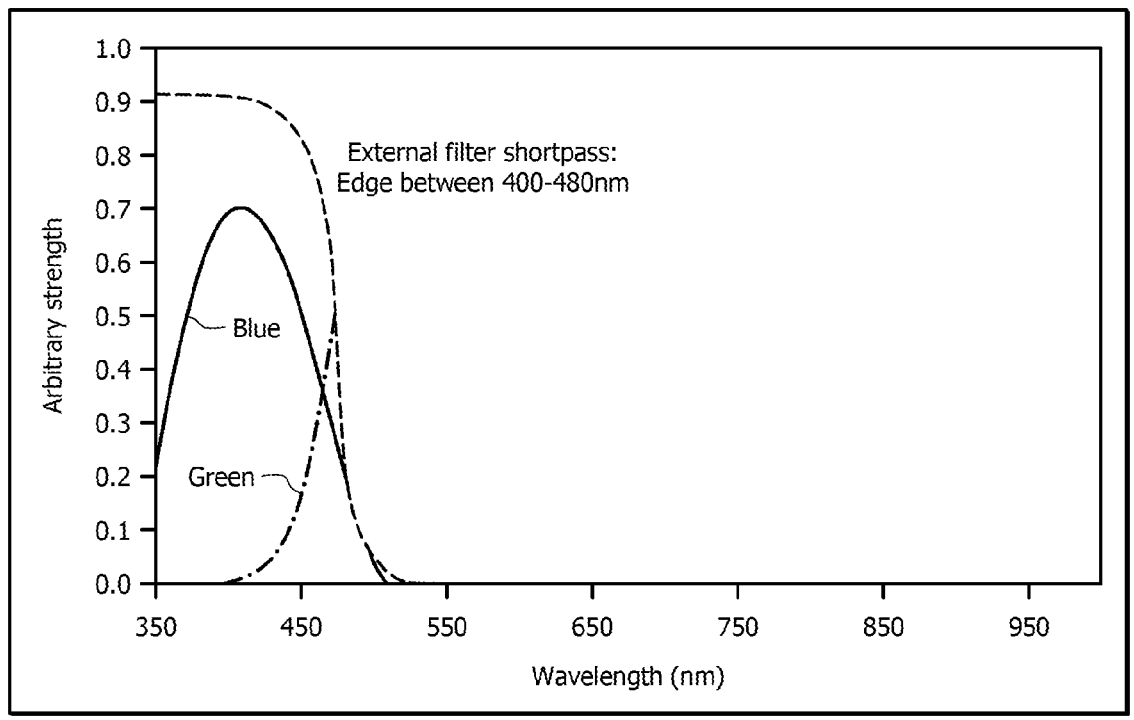

FIG. 5F shows a UV comprising bandpass and two reference bandpasses comprising a first and a second NIR comprising bandpass that can be implemented using modified full spectrum digital color camera with a green stop filter thereon. This embodiment corresponds to FIG. 4A described above. The external green band reject filter is shown rejecting a band from 450 nm to 630 nm, or narrower. FIG. 5G shows a UV comprising shortpass and an NIR comprising bandpass embodiment that can be implemented using modified full spectrum digital color camera with an external UV comprising shortpass having an edge between 400 nm and 480 nm and an NIR comprising bandpass filter that provides the reference band. The NIR comprising bandpass filters pass 620 nm to 750 nm or narrower. FIG. 5H shows a UV comprising shortpass that can be implemented using modified (hot filter removed) full spectrum digital color camera with an external UV comprising shortpass.

Figure 5I:
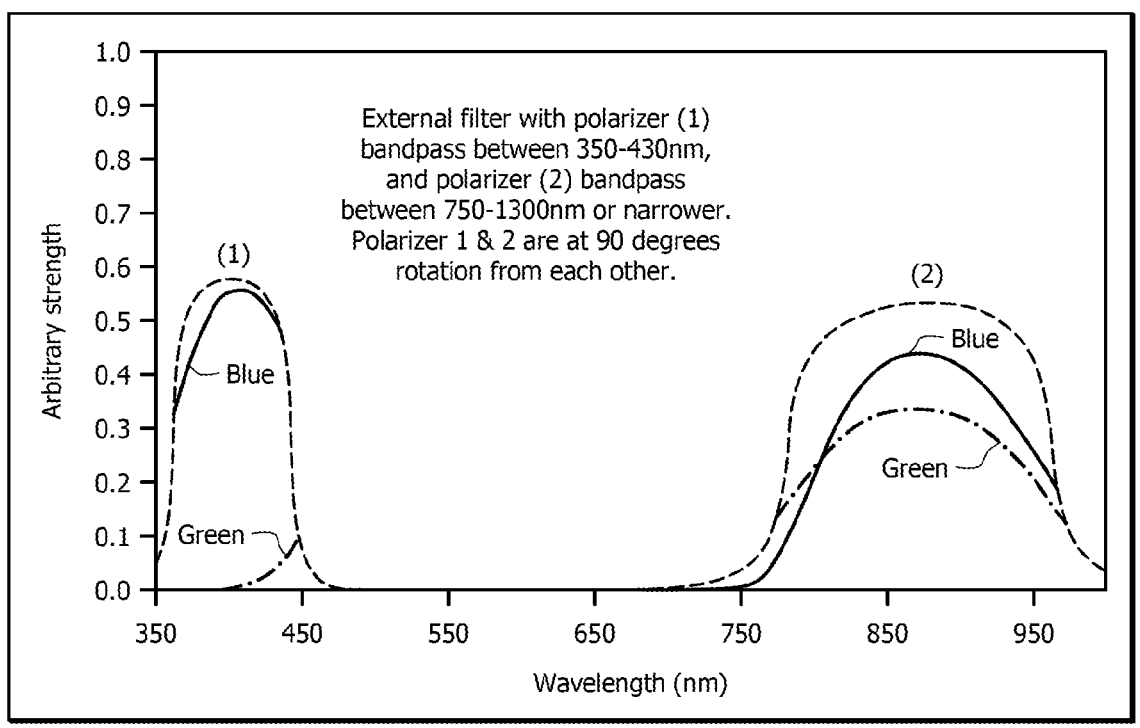

FIG. 5I shows a polarized UV comprising shortpass and a reference band provided by a polarized NIR comprising bandpass that can be implemented using modified full spectrum digital color camera with external filters. Crossed polarizers can help filter natural background clutter against manmade objects that tend to polarize light.

Mathematically, the numerical difference between the polarized intensity values (or detected counts) of each of the crossed polarizer channels (UV and NIR) can reduce the values that are similar (such as a homogenous background), while yielding significant difference in areas that are polarizing. The external filters can comprise a polarizing UV comprising bandpass between 350 nm and 430 nm, and a polarizing NIR comprising bandpass between 750 nm and 1300 nm or narrower. The polarizers are at 90 degrees rotation from each other. In other words, in this embodiment, the polarization of the UV comprising band received by the 2-D photodetector array and the polarization of the NIR bands received by the 2-D photodetector array would be at 90-degree rotation from each other. In one particular embodiment the polarizer can comprise two layers of aligned long-chain polymers with polarized transmission bands as designated. The two films can be crossed and adhered or co-aligned in a single element.

While various disclosed embodiments have been described above, it should be understood that they have been presented by way of example only, and not as a limitation. Numerous changes to the disclosed embodiments can be made in accordance with the Disclosure herein without departing from the spirit or scope of this Disclosure. Thus, the breadth and scope of this Disclosure should not be limited by any of the above-described embodiments. Rather, the scope of this Disclosure should be defined in accordance with the following claims and their equivalents.

Although disclosed embodiments have been illustrated and described with respect to one or more implementations, equivalent alterations and modifications will occur to others skilled in the art upon the reading and understanding of this specification and the annexed drawings. While a particular feature may have been disclosed with respect to only one of several implementations, such a feature may be combined with one or more other features of the other implementations as may be desired and advantageous for any given or particular application.

The terminology used herein is for the purpose of describing particular embodiments only and is not intended to be limiting to this Disclosure. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

I claim:

1. A method of detecting camouflaged or concealed objects in an interrogation region having foliage, comprising:
    receiving at a two-dimensional (2-D) photodetector array at least a portion of reflected light from said interrogation region including at least an ultraviolet (UV) comprising band and simultaneously capturing at least one reference band comprising near infrared (NIR) light while simultaneously filtering out green light, wherein said 2-D photodetector array comprises a plurality of photodetector pixels to provide sensitivity to at least said UV comprising band to capture a higher level of ultraviolet reflections from the camouflaged or concealed objects relative to ultraviolet reflections from the foliage;
    generating with said photodetector array at least a first detection signal from at least said UV comprising band;
    forming with a processor processed image data from data from at least said first detection signal; and
    identifying camouflaged or concealed objects distinguishable in said processed image data from the foliage within said interrogation region at least in part in response to the higher level of ultraviolet reflections captured by said photodetector array in said ultraviolet comprising band.

2. The method of claim 1, further comprising filtering with at least one optical filter optically aligned with respect to said plurality of photodetector pixels said UV comprising band and said at least one reference band comprising NIR light so that said at least one reference band is exclusive of said UV comprising band to further generate at least a first reference signal, and wherein said processor utilizes data from said first detection signal and said data from said first reference signal to generate said processed image data.

3. The method of claim 2, wherein said forming processed image data comprises decorrelating data from said first detection signal and said first reference signal to form a decorrelated detection signal, and wherein said processed image data image is formed from said decorrelated detection signal.

4. The method of claim 2, wherein said forming processed image data comprises at least one of ratioing and scaling said data from said first detection signal and data from said first reference signal, and wherein said processed image data comprises multi-band image data, further comprising generating a displayed image based on said multi-band image data.

5. The method of claim 4, wherein said forming further comprises data normalization, color orthogonalization and Red-Green-Blue (RGB) assignment of said data from said first detection signal and said data said first reference signal.

6. The method of claim 2, wherein said at least first reference signal further comprises a second reference signal, wherein said first reference signal is from a first NIR comprising band, and said second reference signal is from a second NIR comprising band that is different from said first NIR comprising band.

7. The method of claim 2, wherein the filtering comprises respectively band-pass polarizing said UV comprising band, said at least one reference band comprising NIR light and a band comprising visible light, wherein said polarizing comprises different polarizing angles or is co-aligned at a common polarizing angle.

8. The method of claim 1, wherein said identifying camouflaged or concealed objects comprises automatically identifying said camouflaged or concealed objects, and said forming processed image data comprises utilizing at least one of a reference measure, said reference measure selected from UV signal level thresholds from said first detection signal, statistical measures on counts from said 2-D photodetector array, and shapes of detected patterns.

9. The method of claim 1, further comprising scanning a field of view to identify said camouflaged or concealed objects for different surface portions within said interrogation region.

10. An imaging system for identifying camouflaged or concealed objects, comprising:

at least one filter configured to block green light;

an image sensor comprising a two-dimensional (2-D) photodetector array arranged to receive at least a portion of reflected light from an interrogation region having foliage including at least an ultraviolet (UV) comprising band and to simultaneously capture at least one reference band comprising near infrared (NIR) light while simultaneously filtering out the green light via the at least one filter, wherein said 2-D photodetector array comprises a plurality of photodetector pixels to provide sensitivity to said UV comprising band to capture a higher level of ultraviolet reflections from the camouflaged or concealed objects relative to ultraviolet reflections from the foliage, wherein said 2-D photodetector array generates at least a first detection signal from at least said UV comprising band; and a processor for data processing coupled to an output of said 2-D photodetector array that forms processed image data from at least said first detection signal, wherein the camouflaged or concealed objects are distinguishable in said processed image data from the foliage within said interrogation region at least in part in response to the higher level of ultraviolet reflections captured by said photodetector array in said ultraviolet comprising band.

11. The system of claim 10, wherein the at least one filter is optically aligned with respect to said plurality of photodetector pixels to filter said ultraviolet comprising band and said at least one reference band comprising NIR light so that said at least one reference band is exclusive of said UV comprising band to further generate at least a first reference signal, and wherein said processor utilizes data from said first detection signal and said data from said first reference signal to generate said processed image data.

12. The system of claim 11, wherein said at least first reference signal further comprises a second reference signal, wherein said first reference signal is from a first NIR comprising band, and said second reference signal is from a second NIR comprising band that is different from said first NIR comprising band.

13. The system of claim 11, wherein said at least one filter comprises at least one polarizing filter.

14. The system of claim 13, wherein said at least one polarizing filter comprises a plurality of internal polarizing filters optically aligned with respect to said 2-D photodetector array.

15. The system of claim 13, wherein said at least one polarizing filter comprises a filter selected from the group consisting of an external filter and an internal filter, and is configured to band-pass said UV comprising band, said at least one reference band comprising NIR light and a band comprising visible light at different polarizing angles or co-aligned at a common polarizing angle.

16. The system of claim 10, wherein said processor is further configured to decorrelate said UV comprising band and said at least one reference band to form a decorrelated detection signal, and wherein said processed image data image is formed from said decorrelated detection signal.

17. The system of claim 10, wherein said processor is further configured to perform at least one of ratioing and scaling of data from said first detection signal and said first reference signal, and wherein said processed image data comprises multi-band image data, further comprising a video display coupled to an output of said processor that generates a displayed image based on said multi-band image data.

18. The system of claim 10, wherein said processor includes an associated memory that stores at least one of reference measure, wherein said processor is further configured to form said processed image data by utilizing at least one of a reference measure, and wherein said reference measure is selected from UV signal level thresholds from said first detection signal, statistical measures on counts from said 2-D photodetector array, and shapes of detected patterns, and said processor automatically identifies said camouflaged or concealed objects.

19. The system of claim 10, wherein said system further comprises a scanner mechanically coupled said imaging system for scanning a field of view of said imaging system across a plurality of different surface portions within said interrogation region.

* * * * *